United States Patent
Dallas et al.

(10) Patent No.: US 11,632,066 B2
(45) Date of Patent: Apr. 18, 2023

(54) NOISE LIMITED POWER TOOL

(71) Applicant: OREGON TOOL, INC., Portland, OR (US)

(72) Inventors: Edgar A. Dallas, Beaverton, OR (US); Erik Jensen, Portland, OR (US); Shaun Conley, Portland, OR (US); Jonathan Ziring, Portland, OR (US)

(73) Assignee: Oregon Tool, Inc., Portland, OR (US)

( * ) Notice: Subject to any disclaimer, the term of this patent is extended or adjusted under 35 U.S.C. 154(b) by 754 days.

(21) Appl. No.: 16/610,874

(22) PCT Filed: May 2, 2018

(86) PCT No.: PCT/US2018/030743
§ 371 (c)(1),
(2) Date: Nov. 4, 2019

(87) PCT Pub. No.: WO2018/204550
PCT Pub. Date: Nov. 8, 2018

(65) Prior Publication Data
US 2021/0152110 A1 May 20, 2021

Related U.S. Application Data

(60) Provisional application No. 62/500,952, filed on May 3, 2017.

(51) Int. Cl.
| | | |
|---|---|---|
| *H02P 21/05* | (2006.01) | |
| *A01G 20/47* | (2018.01) | |
| *A01D 34/416* | (2006.01) | |
| *A01D 34/84* | (2006.01) | |
| *A01D 69/02* | (2006.01) | |
| *A01G 3/053* | (2006.01) | |
| *A01G 3/08* | (2006.01) | |

(52) U.S. Cl.
CPC ............ *H02P 21/05* (2013.01); *A01D 34/416* (2013.01); *A01D 34/84* (2013.01); *A01D 69/02* (2013.01); *A01G 3/053* (2013.01); *A01G 3/086* (2013.01); *A01G 20/47* (2018.02)

(58) Field of Classification Search
CPC ....... H02P 21/05; A01D 34/416; A01D 34/84; A01D 69/02; A01G 3/053; A01G 3/086
USPC ....................................................... 318/17, 3
See application file for complete search history.

(56) References Cited

U.S. PATENT DOCUMENTS

| | | | |
|---|---|---|---|
| 5,835,676 A | 11/1998 | Komatsu | |
| 5,838,877 A * | 11/1998 | Elliot | H03H 1/0007 318/434 |
| 7,112,933 B1 * | 9/2006 | Ueda | B62D 5/046 318/727 |
| 7,701,159 B2 * | 4/2010 | Chida | H02M 1/126 318/432 |
| 9,948,224 B1 * | 4/2018 | Huh | H02P 21/24 |
| 2004/0232864 A1 | 11/2004 | Sunaga | |

(Continued)

*Primary Examiner* — David Luo
(74) *Attorney, Agent, or Firm* — Foley & Lardner LLP (57) ABSTRACT

Disclosed herein is a power tool that includes a direct current power source, motor, and motor controller. In some embodiments, the power source comprises a battery pack configured to supply current at a nominal voltage in excess of 100 VDC. Embodiments of the tool are configured to operate at a high power at least comparable to tools operating at lower voltages, and to produce noise levels in operation that are less than 65 decibels.

13 Claims, 3 Drawing Sheets

(56) References Cited

U.S. PATENT DOCUMENTS

2005/0007042 A1    1/2005   Moore
2010/0090775 A1    4/2010   Huda
2010/0201299 A1    8/2010   Emde \* cited by examiner

NOISE LIMITED POWER TOOL

RELATED APPLICATIONS

This application claims priority to U.S. Provisional Patent Application No. 62/500,952, filed on 3 May 2017, and which is incorporated by this reference as if fully stated herein.

TECHNICAL FIELD

Embodiments herein relate to the field of electric tools, and, more specifically electric tools with low noise output.

BACKGROUND

Electric power tools, such as leaf blowers, hedge trimmers, string trimmers, edgers, and similar such landscape maintenance implements typically include an electric motor of some sort. Electric motor powered tools can offer advantages over their gas powered counterparts, including silence while not actively engaged, lack of a requirement to store and/or mix fuel, lack of exhaust fumes, and overall lessened maintenance. Electric power tools further may offer cost savings over their lifetime, as the electricity for running a tool or charging a battery pack for a cordless tool typically costs less than purchasing fuel. Even while running, electric power tools are typically quieter than their gas powered counterparts, as the bulk of any generated noise comes from the operating components of the tool, rather than the motor itself.

With the availability of high energy density lithium chemistry battery packs, electric power tools can be made cordless without sacrificing power or gaining substantial weight. As a result, lithium-ion powered cordless tools can offer power levels comparable to, or even exceeding, those of traditional gas-powered implements.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Even though electric tools can be quieter than their gas powered counterparts, these tools may still generate enough noise in operation to cause an environmental impact. Noise sources may include the operative components of the tools, such as blower fan noise, gear and string noise from a string trimmer, gear and bar noise from a hedge trimmer or a chain saw, and other similar sources. This noise may be sufficient to disturb neighbors, disrupt sleep and interfere with normal daily activities. Moreover, if loud enough or with prolonged exposure, noise even from an electric tool can affect personal health. In some instances, local governmental agencies have placed restrictions on the use of tools that generate sound levels deemed to be at a public nuisance level.

The noise profile of an electric power tool typically depends upon its operating parameters. Electric power tools may achieve high power levels by spinning the motor at a high revolutions per minute (RPM) level as compared to a comparable gas powered tool. This may translate to high operating speeds for the tool's operative components, further increasing the tool's noise level. In some cases, the operative components of an electric powered tool may generate greater noise than comparable components of a gas-powered counterpart due to the higher motor operating speeds needed to achieve comparable power. For example, spinning the motor at a relatively high RPM level may necessitate a gear reduction from the motor for driving the operative components at a suitable speed, and for translating the motor's high rotational speed into greater torque. Gear drives, besides imposing a power loss due to heat and additional friction, also increase tool noise, depending upon the gear box configuration.

In the case of cordless tools, these high operating speeds may be necessitated by the limitations of battery pack technology. As will be understood by a person skilled in the relevant art, a battery pack is limited in the amount of current it can provide to a load at a given voltage. As power is a function of voltage multiplied by current, a lower voltage requires a greater current to achieve a given power level. As a general principle, increasing current through a conductor results in an increase in generated heat due to conductor resistance. Dissipation of heat buildup is often aided by using a motor-mounted fan to force air through the motor windings. This may result in high RPM motors being preferable, or even required, over lower RPM motors. Comparatively low RPM motors may be unable to effectively dissipate the heat generated at the voltage levels offered by existing battery systems without an undesirable reduction in available power.

Despite their noise, fumes and often increased weight, gas powered tools still find favor, especially with commercial users who may demand high power levels to efficiently complete jobs. At present, many electric tools are engineered for home users, and so may not be able to deliver commercial level performance.

Disclosed herein are electric power tools that achieve a high power level at a comparably low operating speed and comparably lower motor RPM levels. As a result, the disclosed electric power tools may deliver power that equals or exceeds gas-powered counterparts, to a level comparable to commercial-grade tools, while providing noise levels lower than both comparable gas-powered tools and electric power tools powered in a conventional, high-RPM configuration.

In the following detailed description, reference is made to the accompanying drawings, which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Figure 1:
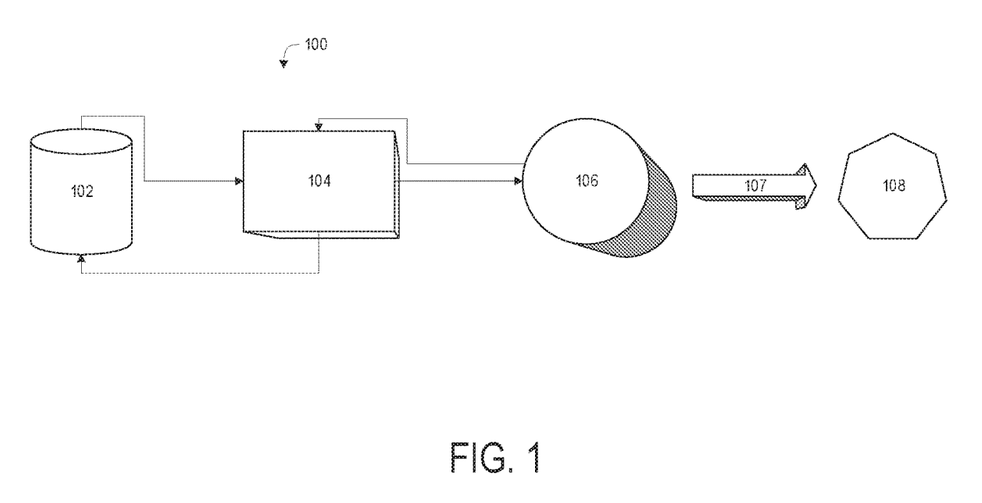
FIG. 1 shows a block diagram of the components of an electric powered tool, according to various embodiments.

Referring to FIG. 1, electric tools 100, such as alternating current (AC) or direct current (DC) operated leaf blowers, stick trimmers, hedge trimmers, chain saws, edgers, etc., may include a power supply 102, such as a power cord or a battery, an electric motor 106 controlled by a control system 104, and a driven element 108 such as a fan blade, string trimmer head, hedge trimmer bar, saw chain, or similar implement, driven by the electric motor 106. The driven element 108 may be supplied mechanical power by the electric motor 106 via a drive train 107, which may convert the rotational motion from the electric motor 106 to a type suitable for driven element 108.

Power supply 102 may be either a power cord that can be connected to an electrical supply, or a self-contained power pack. Where power supply 102 is a power cord, it may be configured to plug into an electrical supply such as a portable power pack or battery pack, which may supply a suitable voltage and current. In some embodiments, this voltage may be at least 90 VDC. The acceptable supply voltage may vary depending upon both the typical use environment for the tool 100, as well as the nature of the tool 100 itself.

Power supply 102 may also be a self-contained power pack that engages directly into tool 100, such as a battery pack. The power supply 102 may be configured to provide a nominal voltage at or greater than at least 90 volts DC (VDC) or greater than 100 volts DC (VDC). Where power supply 102 is a battery pack, the battery pack may be comprised of one or more power cells, such as lithium-ion (Li-ion) cells, arranged in parallel and/or series combinations to achieve a desired voltage, current, and capacity. For example, for a tool 100 configured to accept 100 VDC, power supply 102 may comprise 30 Li-ion cells wired in a series configuration (30-S), each with a nominal cell voltage of approximately 3.6 VDC. When wired in series, the cells' voltages are additive while retaining a current capacity equivalent to the average of all cells, resulting in a total nominal voltage of 3.6 VDC*30=108 VDC. It will be understood that such a pack may have an operating voltage range from ~126 VDC at full charge with no load (each cell has a full charge voltage of 4.2 VDC), to approximately 90 VDC approaching full discharge when under load (each cell may be drained down to an at-load voltage of approximately 3 VDC without damage or unacceptably shortening cell life). These figures may vary from embodiment to embodiment depending upon the selected type and chemistry of power supply 102's constituent cells.

Power supply 102, in battery pack embodiments, may also be configured with one or more cells wired in a parallel configuration, where the overall current capacity is additive, but voltage is averaged across all cells, so as to achieve a battery pack that has increased current delivery. If, for example, two Li-ion cells each capable of delivering a sustained current of 5 Amps at a nominal 3.6 VDC are wired in series, the resulting pack would deliver 7.2 VDC (3.6 VDC*2) at a sustained current of 5 Amps. Rewiring the cells in parallel would result in a battery pack capable of delivering a sustained current of 10 Amps (5 Amps*2), but at the nominal cell voltage of 3.6 VDC. Battery packs may further be configured to use a combination of series and parallel configurations to enhance both voltage and current delivery levels. For example, if the 30-S battery cell configuration described above is doubled in a parallel configuration (two 30-S sets of series-wired cells wired in parallel), the resulting 60 cell battery pack may supply the same voltage level of the 30-S pack, 108 VDC nominal (3.6 VDC*30), but with twice the current delivery (if each cell can sustain 5 Amps, then the overall pack could deliver 10 Amps continuous at 108 VDC nominal). Such a pack may be designated as a 30-S 2-P configuration, indicating two sets of 30 cells wired in series, the two sets being wired in parallel. Other configurations of S– and P– may be implemented to achieve a battery pack with desired nominal voltage and current delivery characteristics suitable to an intended application. It should further be understood that other considerations, such as the overall weight and bulk of tool 100 when power supply 102 is installed or connected, may factor into a chosen battery pack configuration.

As discussed above, power supply 102 may provide power into control system 104 as well as electric motor 106, where control system 104 may be responsible for controlling and modulating the flow of power from power supply 102 into electric motor 106. Control system 104 may enable a user of tool 100 to selectively actuate tool 100, as well as moderate the power being delivered to driven element 108, and thus the total power provided by tool 100 for a given job.

Control system 104 may be implemented as one or more electronic controllers, such as a microprocessor, a microcontroller, discrete circuitry such as transistor-transistor logic (TTL) and/or power regulating components such as suitable resistors, capacitors, and/or inductors, a combination of the foregoing, or some other device offering similar functionality. Some embodiments may implement some or all of control system 104 using a field-programmable gate array (FPGA), application-specific integrated circuit (ASIC), or another similar technology. In some embodiments, control system 104 may include a computer-readable medium such as a memory storage unit containing instructions capable of being executed by a processing unit that is part of control system 104. These instructions may be configured to provide power to electric motor 106 in an optimal way so as to maximize power available to driven element 108 while minimizing the noise profile of tool 100.

Control system 104 may include, at least in part, circuitry for controlling the power to electric motor 106. The specifics of this circuitry may depend upon the nature of electric motor 106, and may be considered to be partially or wholly an electronic speed controller (ESC). The ESC of control system 104 may modulate flow of current to (and thus the power delivered by) electric motor 106 using any technique suitable to electric motor 106. For example, the ESC may employ pulse-width modulation (PWM) to provide a desired voltage and current to electric motor 106. Control system 104 may use power switching devices such as MOSFETs, controlled by a portion of control system 104, to effect switching of the power supply 102 to electric motor 106 to achieve a desired power level, as may be commanded by a user of tool 100.

PWM may be implemented as a switching technique where the full current and voltage provided by power supply 102 is delivered in regular controlled pulses (bursts of "on") interspersed with power being shut off from power supply 102. The intervals between the pulses may be defined as a PWM frequency or carrier frequency. If the time duration between the start of a pulse (switching on) and the start of a subsequent pulse is sufficiently short, the effective voltage and current, and resultant power, seen by electric motor 106 becomes the average between the voltage of a pulse and its corresponding off time. The effective voltage seen by the electric motor 106 may be expressed by an equation such as $V_{eff}=V_{supp}*(t_{pulse}/t_{freq})$, where $V_{eff}$ is the effective voltage, $V_{supp}$ is the voltage provided by power supply 102, $t_{pulse}$ is the time duration of the on pulse, and $t_{freq}$ is the time width of an on-off cycle (the carrier frequency). For example, if power supply 102 supplies a nominal voltage of 108 VDC, a duty cycle of 50% over a given time period at a PWM frequency of 10 kHz can result in an effective voltage of 54 VDC, as such: 108*(0.00005/0.0001). At 10 kHz carrier frequency, the pulse interval duration is 0.0001 second; with a duty cycle of 50%, each pulse takes up half the pulse interval duration, resulting in a pulse lasting 0.00005 second. In another example, a duty cycle of 75% would result in 108*(0.000075/0.0001)=81 VDC. It may be recognized that multiplying the voltage by the duty cycle percentage will yield the same results, regardless of carrier frequency.

For electric motor 106 to see an average power rather than a series of discrete on-off cycles, the pulse width duration must be sufficiently short. Controllers implementing PWM for power control typically employ a carrier frequency below 7 kHz, which is within the typical audible range of most users, and may be perceived as a high-pitched whistle, which may be especially noticeable as tool 100 is operated at lower powers. This high-pitched whistle can contribute to the overall noise profile of tool 100. In embodiments, using a PWM carrier frequency at or above 7 kHz can effectively reduce or even push the whistle beyond the audible range of most users, thereby lowering the noise profile of tool 100. As the carrier frequency is increased above 7 kHz, the noise profile of tool 100 may continue to improve. However, switching losses due to PWM may also start increasing, depending upon the configuration of control system 104 and electric motor 106. These losses may result in unacceptably high power losses, and may further result in generation of unwanted spurious RF frequencies. In various embodiments, 10 kHz was found to yield good power with acceptable switching losses, and at a frequency that a majority of users either do not perceive or do not notice as irritating. Thus, certain embodiments may use a PWM carrier frequency of from 9 kHz-11 kHz. For some tested implementations, a PWM carrier frequency of 20 kHz, while resulting in good audio characteristics, resulted in unacceptable switching losses; however, this may be mitigated by varying the configuration of control system 104 and electric motor 106. The choice of carrier frequency may ultimately be influenced by the electrical characteristics of electric motor 106, e.g. impedance/inductance, as well as by possible RF emissions requirements, as higher carrier frequencies may result in spurious RF emissions being generated.

Control system 104 may also employ various drive methodologies for electric motor 106. For example, some embodiments of control system 104 may use a sinusoidal wave field-oriented control (FOC) to drive electric motor 106 (e.g., where electric motor 106 is a brushless type), which may provide a greater efficiency over traditional triangle-wave drive methods. Moreover, depending upon the configuration of electric motor 106, a sinusoidal wave FOC may further reduce noise from tool 100 by reducing side effects found in traditional motor commutation techniques. These side effects may include torque ripple, which can generate spurious vibrations and, depending upon the nature of the vibrations, contribute to the noise profile of tool 100. By employing sinusoidal wave FOC, the noise profile of tool 100 can be further reduced in various embodiments.

Electric motor 106 may be any suitable motor that is capable of being driven by a properly configured control system 104. In some embodiments, electric motor 106 may be a self-commutating brushed motor, where control system 104 need only supply a proper voltage and current to electric motor 106, with the speed and/or power delivered by electric motor 106 determined by the voltage and available current. In other embodiments, electric motor 106 may be of a brushless type, such as a three-phase externally commutated motor (also known as a brushless DC motor), where switching between motor phase windings is handled electronically by control system 104, and, in particular, ESC circuitry of control system 104. In further embodiments, electric motor 106 may be of an outrunner type, where the stator pole windings are held fixed in the core of electric motor 106, while the motor can (typically outfitted with a plurality of permanent magnets) spins to provide the motor's motive force. Brushless DC outrunner motors may spin at lower RPMs while still producing relatively high torque as compared to more traditional inrunner configurations, where the stator pole windings are disposed on the outside of the motor can, with the spinning rotor comprising the core of the motor. Outrunner motors typically have a differing number of magnetic poles in the rotating can than stator pole windings, to ease motor starting and prevent cogging, which in turn results in a smoother running and more efficient motor.

Figure 2:
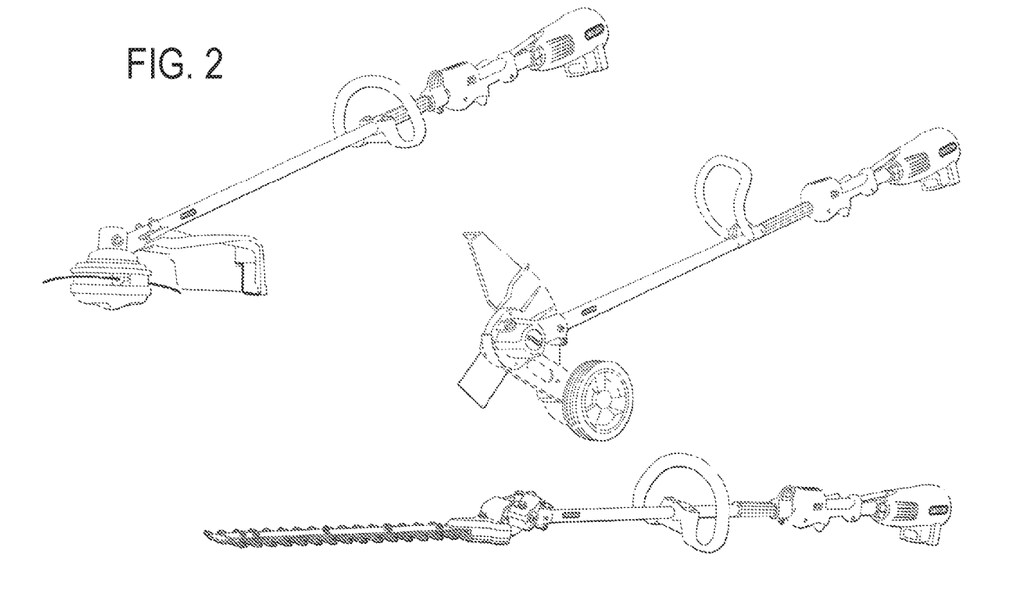
FIG. 2 depicts several examples of stick tools, according to various embodiments herein.

In embodiments, electric motor 106 may be a brushless DC motor, as described above. In some embodiments, electric motor 106 may comprise a nine stator pole, 6 magnetic pole outrunner configuration. The stator may be wound in a delta configuration, and the number of turns may depend upon the particular application for which electric motor 106 is employed. For example, stick type tools such as string trimmers, hedge trimmers, and edgers (as seen in FIG. 2) may employ an electric motor 106 that has stator poles with 31-turn windings. Tools such as blowers, which may require a somewhat higher RPM, may employ 38-turn stator windings. In some examples, electric motor 106 may utilize stator poles with between 30 to 40 windings, with copper wire configured for motor windings or another high temperature use, such as magnet wire. The selected wire may be between 0.50 mm to 0.70 mm in diameter. In particular, where tool 100 is a blower, the wire may be approximately 0.60 mm in diameter. Where tool 100 is a stick tool such as a string trimmer, edger, hedge trimmer, or other such tool, the wire may be approximately 0.64 mm in diameter. Other tool 100 embodiments may vary these parameters as needed to achieve a high-power low-noise operation. Thus, the number of stator poles, magnetic poles, and stator pole windings can vary to provide a high power but low speed motor suitable to the application of a given tool 100.

In embodiments, the electric motor 106 may provide a particular power density, yielding a tool 100 that is powerful, while lighter and quieter than electric motors commonly used in currently known battery powered power tools. Power density (or volume power density or volume specific power) as used here is the amount of power (time rate of energy transfer) generated per unit volume (of the motor). The more powerful and (or) the smaller the motor in envelope size, the higher the power density. A high power density motor used in a tool 100 per the disclosed embodiments described herein may have a mechanical output power of about 1000 watts to about 2000 watts, such as 1600 watts, and may weigh about 1000 grams to about 1200 grams, such as about 1100 grams, yielding a power density of about 1.4 watts per gram. In various embodiments, a high power density electric motor 106 has a power density of greater than about 1.2 watts per gram, greater than about 1.3 watts per gram, greater than about 1.4 watts per gram, greater than about 1.5 watts per gram, or even greater than about 1.6 watts per gram. In comparison, electric motors typical of current tools range from 0.5 to 2.0 watt/gram. Comparative 1 to 2 watt/gram power density motors run at higher speed, such as a 23,000 RPM 40V blower motor, for example, with 800 watt output and weighing 700 grams, yielding a 1.1 watt/gram power density.

Embodiments of electric tool 100 have a power range from about 1000 watts to about 2000 watts, such as 1600 watts. Typical power range of electric leaf blower motors is 250 to 1200 watts. In embodiments, the disclosed electric tool has a nominal voltage range from about 90 volts to about 130 volts, such as 108 volts or 120 volts, whereas typical electric tools have a nominal voltage range of 18 to 86 volts. In an embodiment, a power source may be configured to provide a nominal voltage of at least 100 volts direct current (VDC).

In an embodiment, a tool 100 has an electric motor configured to provide substantially identical power to an electric motor in a tool that is powered by a power source that provides less than 100 volts.

Electric motor 106 is in-turn connected to a driven element 108 via a drive train 107. Drive train 107 may, in some embodiments, be as simple as a direct transmission shaft that powers the driven element 108 at a 1:1 ratio with each turn of electric motor 106. In such embodiments, the driven element 108 operates at a speed equivalent to electric motor 106. Still further, in some such embodiments electric motor 106 may directly drive driven element 108, where drive train 107 is omitted in favor of attaching driven element 108 directly to the output shaft of electric motor 106. In other embodiments, drive train 107 may comprise a gear drive or gear box, such as where tool 100 requires reciprocating, rather than rotational, motion. For example, where tool 100 is a hedge trimmer, the cutting bar may rely upon a reciprocating motion, and so drive train 107 may comprise an eccentric cam or crankshaft configuration to convert the rotational motion of electric motor 106 into a reciprocating motion to drive the cutting bar. Still other types of driven elements 108 may require a slow RPM speed below what electric motor 106 can feasibly deliver. A drive train 107 for such an application may be designed with low-friction materials as well as a helical or hypoid gear configuration to minimize any gear train noise, and thereby reduce the noise profile of tool 100.

Driven element 108 may be any implement designed to carry out the intended tasks of tool 100, e.g. a string reel for a string trimmer, a cutting bar for a hedge trimmer, a rotating blade for an edger, a drive sprocket and saw chain for a chain saw, or a fan or turbine disc to direct air through a plenum for a blower, etc. It should be understood that these are merely examples; other types of tools may require driven elements 108 appropriate to their designed tasks. Each driven element 108 may further be refined in ways specific to the nature of driven element 108 to reduce the noise profile of tool 100. For example, where tool 100 is a string trimmer, driven element 108 may be directly attached to electric motor 106, which is configured to run at an appropriate head speed for driven element 108. Where electric motor 106 is configured to provide a high torque level at an RPM equal or lower to a conventional string trimmer, driven element 108 may be able to be spun at a lower RPM without sacrificing power, resulting in a lower noise tool 100 that still delivers relatively high power. Driven element 108, in the case of a string trimmer, may further be equipped with aerodynamically enhanced or designed line so as to minimize power draw. The lower head speed enabled by a high-power low-RPM electric motor 106 may reduce the noise profile of tool 100 by avoiding the tip of the string from traveling at or near supersonic speeds. Similar such gains can be realized from operating the driven elements 108 of the various embodiments of tool 100 described above at lower speeds, but with a motor delivering comparably higher torque so that power is maintained.

Other improvements in the noise profile of tool 100 may be realized depending upon the nature of tool 100. For example a tool 100 that is a blower may use a more aggressively designed fan or turbine that is configured to move a higher volume of air at a lower RPM, e.g. by increasing its diameter, number of blades, blade pitch, etc. A fan may be aggressively designed to move a large volume of air at a lower RPM at the expense of requiring greater torque output from the motor. Such a fan may thus be optimized to the running parameters of electric motor 106, which may be configured to provide greater torque at a lower RPM. For example, a blower according to various embodiments may include an electric motor 106 configured to turn at a maximum of 5500 RPM, with the fan being directly driven by electric motor 106. Further reductions in fan speed (and associated noise) may be possible, with consideration given to the overall weight and size of the combination of fan and electric motor 106. Specifically, operator comfort and usability of tool 100 may become limiting factors that hinder further noise reductions, rather than technical limitations.

Where tool 100 is a blower, the blower may be capable of outputting air at a force of at least 20 N (Newtons). In some specific examples, a blower tool 100 may output air at a force at or above 22 N. This force captures both aspects of a blower output—air velocity, and air volume. Air velocity may be increased by adding a comparatively smaller nozzle to the end of the output plenum, which can raise the pressure and velocity by reducing the air volume. Conversely, a larger nozzle may increase the volume of air used, but at a decreased pressure, and hence velocity. High air velocity without a high corresponding air volume can yield a blower that is capable of "pushing" debris easily, but only in a limited area; this may increase the time it takes to complete a job. High air volume without a corresponding high velocity may yield a blower that does not have significant pushing power, which may limit the types of jobs that can be handled to only very light debris. Tool 100 may offer both high velocity and high volume, while maintaining a low noise profile.

As disclosed above, tool 100 has been advantageously designed via the foregoing elements of power supply 102, control system 104, electric motor 106, drive train 107, and driven element 108 to operate at high power while producing noise far below the expected level. In embodiments, a disclosed electric tool 100 emits sound at less than 65 decibels (dB), such as less than 64, less than 63, less than 62, less than 61, less than 60, or even less than 59 decibels, such as between 59 and 65 decibels or between 59 and 62 decibels, as experienced by a bystander at 50 feet from the tool (or as measured by a decibel meter or other tool at the same distance).

As will be understood from the foregoing, in various embodiments, the electric motor 106 is designed to run at a lower rotational speed than a typical tool motor without sacrificing power output. The reduction in working speed translates to less noise being emitted from the motor 106 and from driven element 108. In some embodiments, such as where tool 100 is a blower, the noise reduction may be realized both from the working end of the tool (e.g. the blower output plenum) and the intake end of the tool. Additionally, structural born noise is reduced. In embodiments, the disclosed electric tool 100 at full power operates between about 5000 RPM to 8000 RPM, such as 5800 RPM. By comparison a typical combustion motor at full power operates at 6500 to 7500 RPM. A typical DC motor, such as of an inrunner configuration, operates at 8000 RPM to 30,000 RPM, sometimes in conjunction with gear reduction.

As will be appreciated from the foregoing, in various embodiments, the electric motor 106 used in the tools disclosed herein are further designed for low RPM by using high temperature winding wire material and high temperature high power magnets, such as neodymium magnets. In embodiments, using a 108 VDC nominal power supply 102 results in a smaller electric current running through the motor for a given power level, and less power loss. Because power is a product of voltage and current, a higher voltage requires less current to achieve a given power level. As discussed above, higher currents typically result in increased heat through a given conductor, such as a motor winding. Typical power tool motors are 18 VDC to 86 VDC and need to exceed 8,000 RPMs in order to achieve a high enough RPM to properly cool the high power motor. By using a higher voltage, the current required to achieve a comparable power level in tools 100 in the disclosed embodiments is reduced, which may result in an electric motor 106 that does not generate heat as quickly as conventional tools that use lower voltage power supplies. In addition, by running the motor at a lower RPM, bearing noise, electrical harmonics, and motor fan noise may be reduced.

In a stick tool example, such as but not limited to the tools shown in FIG. 2, the drive shaft rotates at a lower RPM because of the relatively low speed electric motor 106 disclosed herein. This results in less shaft noise due to lower friction and vibration. The drive train 107, a low RPM drive shaft, may also result in a low RPM gear box (below 6000 RPM), if a gear box is necessary (e.g. in the case of a hedge trimmer). There is less gear reduction and hence less gear box noise due to lower gear friction, bearings and vibration. With respect to a string trimmer head, this lower RPM results in a significantly quieter string trimmer head. As discussed above, electric motor 106 may effectively directly drive the string trimmer head, either via a simple shaft as drive train 107, or via direct attachment. Direct attachment may be accomplished by locating the electric motor 106 proximate to the string trimmer head, and directly attaching the head to electric motor 106, thereby omitting drive train 107. A higher RPM in a conventional trimmer means the string tip is traveling at a higher velocity as noise increases roughly equal to the square of the string tip velocity. As disclosed, using lower RPMs results in a reduction of noise due to string tip velocity.

Figure 3:
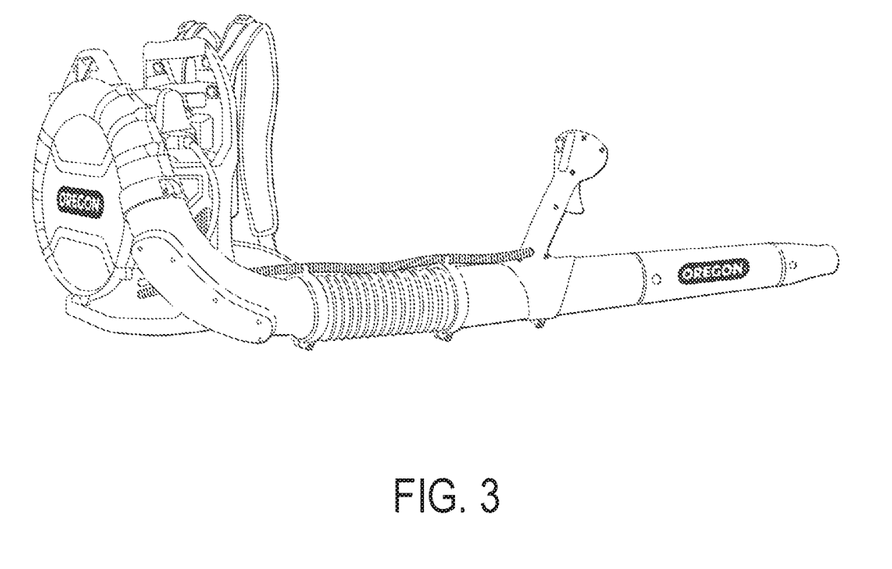
FIG. 3 depicts an electric leaf blower, according to various embodiments herein.

In another example, in particular, a backpack leaf blower such as shown in FIG. 3, the tool noise profile can be further limited by various structural arrangements, such as using an inward-facing fan intake. The inward facing positioning of a fan intake prevents noise generated by the fan blades from escaping into the environment. In addition, a downward facing air intake minimizes fan noise emissions both to the user and to bystanders. In embodiments, the fan diameter and geometry are optimized to reduce noise. For example, at a relatively low 5800 RPM fan speed, noise mitigation has found optimal a 260 to 300 mm fan outer diameter, such as 270 mm. Fan noise increases roughly equal to the square of the fan blade tip velocity. The combination of a higher speed motor with a low fan speed needs mechanical reduction which can cause high noise as well as poor noise tonality. Using a lower speed motor, such as described herein, aids in reducing this noise.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. An electric power tool, comprising:
   a power source configured to provide a nominal voltage of at least 100 volts direct current (VDC); and
   an electric motor coupled to the power source so as to selectively receive power,
   wherein the electric motor operates within an RPM range that results in the tool emitting a sound that is less than 65 dB, as experienced by a bystander at 50 feet from the tool.

2. The electric power tool of claim 1, wherein the tool is one of a string trimmer, an edger, a hedge trimmer, a chain saw, and a blower.

3. The electric power tool of claim 1, wherein the electric motor is to selectively receive power from the power source via a pulse-width modulation (PWM) controller configured to operate at a carrier frequency of at least 7 kHz.

4. The electric power tool of claim 3, wherein the electric motor is a brushless motor, and the PWM controller is configured to drive the electric motor using sinusoidal field oriented control.

5. The electric power tool of claim 4, wherein the pulse-width modulation (PWM) controller is configured to operate at a carrier frequency of approximately 10 kHz.

6. The electric power tool of claim 4, wherein the electric motor has an outrunner configuration.

7. The electric power tool of claim 6, wherein the electric motor is configured to operate at a maximum speed of less than 6000 RPM.

8. The electric power tool of claim 6, wherein the electric motor is configured with nine stator poles and six magnetic poles.

9. The electric power tool of claim 1, wherein the power source comprises a battery pack.

10. The electric power tool of claim 9, wherein the power source has a nominal voltage of approximately 120 VDC.

11. The electric power tool of claim 9, wherein the power source is comprised of at least 30 lithium ion battery cells in a series configuration, and has a nominal voltage of approximately 108 VDC.

12. The electric power tool of claim 1, wherein the tool has a maximum power output greater than 1000 watts.

13. The electric power tool of claim 1, wherein the electric motor has a power density of between 1.0 and 1.4 watts per gram.

* * * * *